United States Patent Office 3,011,307
Patented Dec. 5, 1961

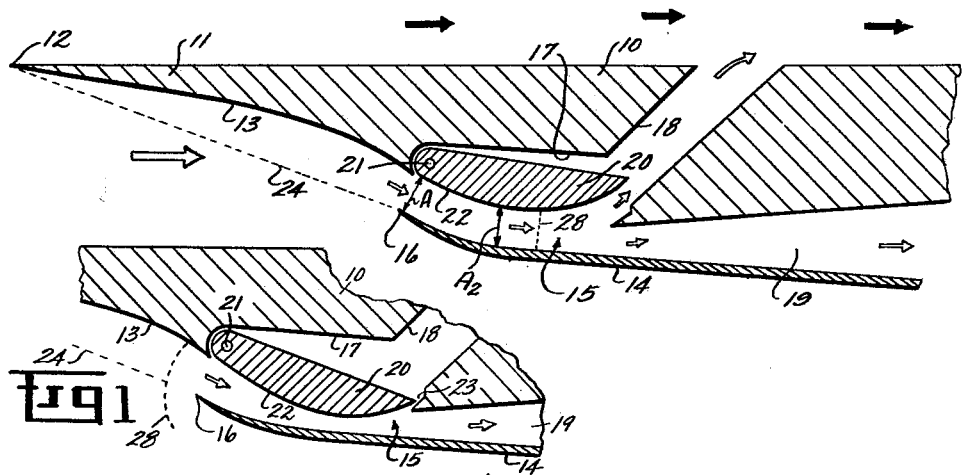
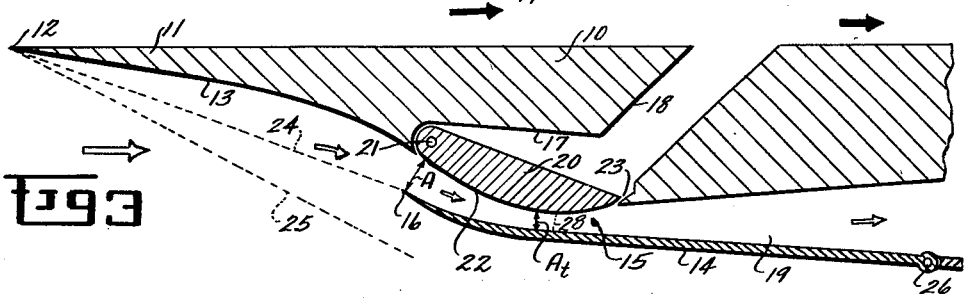
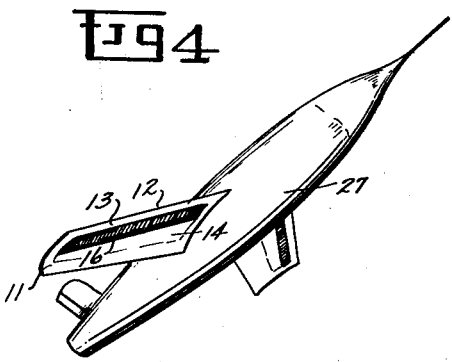
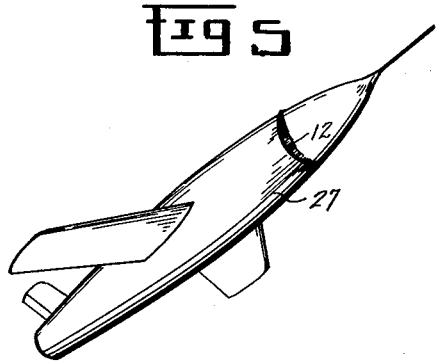

3,011,307
VARIABLE THROAT SUPERSONIC DIFFUSER
Ivan Hans Edelfelt, Schenectady, N.Y., assignor to General Electric Company, a corporation of New York
Filed Dec. 15, 1955, Ser. No. 553,251
7 Claims. (Cl. 60—35.6)

This invention relates to a variable throat supersonic diffuser and, more particularly, to a hinged throat inlet for a supersonic diffuser in a reaction-type powerplant, such as a ram-jet.

In reaction-type, air breathing powerplants, such as ram-jets, a problem exists in the funneling in of the air into the powerplant in an efficient manner. In the case of powerplants operating at supersonic speeds, this problem is far more severe because of the occurrence of shock waves.

When a powerplant is traveling at some given velocity, the air has a total pressure energy relative to the powerplant by virtue of the velocity of the powerplant relative to the air. The output of the powerplant and therefore the efficiency is dependent to a large extent upon the amount of total pressure energy which is retained by the air which has been funneled into the powerplant. The problem is therefore to funnel in the air with a minimum loss in the total pressure energy.

Since disturbances in air are transmitted at the speed of sound, an object traveling at a supersonic velocity is unable to communicate its presence to the air ahead of it. As a result a shock wave or series of shock waves is formed. A shock wave always results in a loss in total pressure energy. However, the magnitude of this loss is dependent upon the type of shock wave, the Mach number ahead of the shock wave and the angle through which the flow is deflected by the shock wave. For purposes of simplicity, only two types of shock waves need be considered. These are the normal shock and the oblique shock. As the name implies, the normal shock is normal to the direction of air flow and across it there is an abrupt change in Mach number and no change in flow direction. A characteristic of this type of shock wave is that the flow behind it is always subsonic. The loss in total pressure energy resulting from this type of shock is a function of the upstream Mach number with very large losses occurring at relatively low supersonic upstream velocities. For this reason, in the design of an inlet for a powerplant which is to travel at a supersonic speed, it would be desirable to provide some means whereby the occurrence of a normal shock could be eliminated. However, since the air must be brought to a subsonic velocity in order to be used efficiently, it is not feasible to eliminate the normal shock completely. However, the invention disclosed herein provides a means by which the normal shock can be made to occur at a Mach number only slightly above 1.0, and with a minimum loss in total pressure energy.

The second type of shock wave mentioned is the oblique shock. This type of shock is caused by an abrupt change in the relative flow direction and results in an abrupt reduction in Mach number. For any given upstream Mach number, the change in Mach number and therefore the amount of deceleration obtained by the oblique shock varies directly as the amount of the change in the relative flow direction. Under some circumstances the flow behind this type of shock wave can be subsonic but in most general cases it will still be supersonic. Although there is also a total pressure energy loss associated with this type of shock, it is far less than that associated with the normal shock. This is especially true if the oblique shock is caused by only a small amount of change in the relative direction of the air flow. It is also more efficient, that is, there is less loss in total pressure energy to decelerate a supersonic air stream by a series of small oblique shocks rather than by one large one. The limiting case is then a surface which has a smooth continuous curvature. This is the so-called isentropic spike and may be thought of as an infinite number of infinitesimally small deflections. My invention is shown with this type of external spike although its application is not limited to this type.

Before discussing the principle behind by invention, a little more theory regarding air flow will be helpful. Consider a duct of any arbitrary cross section in which air is flowing. If the cross sectional area of this duct is at all points equal, the velocity and therefore the Mach number for the ideal case wil remain constant. However, if the cross sectional area varies, the Mach number will also vary. From the equations governing the flow of a compressible gas such as air, it can be shown that for a given air stream the maximum weight flow of air per unit of cross sectional area will occur when the flow is at sonic velocity which is Mach 1. From this same analysis it is also shown that for the case of subsonic flow in a duct, a converging passage will accelerate the flow and a diverging passage will decelerate the flow. For supersonic flow in a duct the effect of changes in area is just opposite, that is, a diverging passage will accelerate the flow while a converging passage will decelerate it. In no case is it possible to reduce the area below that required for sonic velocity without a corresponding decrease in the weight flow. In such a case the amount of weight flow would be limited to that which results in a Mach number of 1 at the minimum area.

Consider a duct having a supersonic flow approaching it. If this duct is the inlet of a supersonic powerplant, it would be desirable to decelerate the flow from the original supersonic Mach number to a Mach number near, but slightly above, 1 by means of a converging inlet. The ratio of inlet area to minimum area which would be required to decelerate a given flow to a Mach number of 1 is a function only of the original or approach Mach number with the required area ratio increasing with increasing approach Mach number. For convenience in referring to this area ratio later, it will be called the "theoretical area ratio." Now if we assume that we have this duct with a converging inlet such that the area ratio is equal to the theoretical area ratio for a particular approach Mach number, the so-called starting shock must be swallowed before supersonic flow can be established in the inlet. To visualize this swallowing of the starting shock, the following explanation will be helpful.

In the case of a supersonic powerplant, the powerplant is brought up to speed either by its own power or by some auxiliary power. In either case, when the powerplant is traveling at below design speed, a normal shock will be located ahead of the inlet if a converging inlet is used. This shock is formed because the minimum area will not permit the entire flow to pass, and as a result some of the air approaching the inlet will have to be spilled around the outside. The shock results because in supersonic flow an abrupt change in direction can be accomplished only by means of a shock wave. Now if, when arriving at the design speed, the normal shock is to pass through the inlet and thus let supersonic flow be established, there must be some time at which the normal shock is attached to the inlet, which means no flow can be spilled. From the theory described earlier it is known that the Mach number after the normal shock is subsonic with the value being determined only by the approach Mach number. Also, it is known that since the flow is subsonic in the inlet behind the normal shock, the converging inlet will accelerate the flow. The amount of convergence, or the area ratio, is limited to the value which results in Mach 1 at the minimum or so-called throat area. This ratio of inlet area to throat area will be called the "critical area ratio," and for all supersonic approach Mach numbers this critical area ratio is far less than the theoretical area ratio. Therefore, a converging inlet of fixed geometry could have an area ratio no greater than the critical. Such an inlet would start, that is, swallow the starting shock, but after supersonic flow had been established in the inlet the amount of decleration would be small. The Mach number at the throat would therefore still be relatively high and the normal shock located there would result in a large loss in total pressure energy. The normal shock inside the duct is required since the air flow must be made subsonic if it is to be used efficiently by the powerplant. By providing a means whereby the area ratio can be varied so that when starting, the area ratio is less than the critical and when in normal operation, the area ratio is near the theoretical value such that the flow decelerates to near sonic at the throat, a diffuser is provided that must operate more efficiently than heretofore.

Accordingly, the main object of the present invention is to provide a supersonic diffuser having a variable area ratio.

A further object is to provide such a diffuser having a critical area ratio or less in order to swallow the shock for starting and then vary this ratio in order to provide further deceleration of the flow.

Another object is to provide a supersonic diffuser wherein the throat area may be reduced after the shock has been swallowed in order to increase the area ratio and decelerate the flow.

Still another object is to provide such a diffuser wherein both the inlet area and throat area may be increased in order to vary the area ratio for the same purpose.

Another object is to provide such a diffuser which is designed to have a critical area ratio or less in order to swallow the shock and then is flexible to vary this ratio mechanically above the critical area ratio in order to decelerate the flow to Mach 1 or higher.

Briefly stated, in accordance with one aspect of my invention, I provide a two-dimensional supersonic diffuser having a hinged throat inlet so that the throat of the inlet may be varied to provide for the critical area ratio or less in starting and an increase above the critical area ratio for normal operation to improve the diffuser efficiency. In addition, I illustrate means whereby the inlet area and throat area may be varied together to accomplish the same purpose.

My invention will be better understood from the following description taken in connection with the accompanying drawing and its scope will be pointed out in the appended claims.

In the drawing:

FIGURE 1 is a partial cross sectional view of a two-dimensional diffuser inlet showing the location of the starting shock prior to the opening of the throat flap;

FIGURE 2 is a view similar to FIGURE 1 showing the position for starting;

FIGURE 3 is a view similar to FIGURE 2 showing the reduced throat area for normal operation;

FIGURE 4 is a perspective view showing the application of the invention to a missile-type object employing a wing intake and;

FIGURE 5 is a view similar to FIGURE 4 showing the application of the invention to the fuselage or body of a missile-type object.

The invention will be described and illustrated primarily for a two-dimensional application as may be employed in a wing although it is to be understood that the concept taught by the invention is not necessarily limited to two-dimensional application.

Referring first to FIGURE 2, which for a clearer understanding of the invention may be considered to be the cross section of a split wing installation, there is shown a member 10 that can form part of a wing. The forward or upstream end of member 10 is formed into a spike or pintle 11 having a leading surface edge 12 and a concave lower surface 13 which may be formed in an isentropic curve for the compression of fluid at the designed supersonic speed. A second flow defining member 14 is disposed in spaced relation from member 10 to define a passage generally indicated at 15 between member 10 and member 14. Member 14 has a leading surface edge or lip 16 which is preferably curved inwardly toward concave surface 13 and may extend forwardly substantially to the downstream end of the concave surface 13. The inlet area, which is defined as the area between lip 16 and member 10 and is designated as A, is designed to capture the fluid flow upstream as indicated by the arrow.

In order to provide for a variable throat within passage 15, a recess 17 is provided in member 10 on the passage side of the member. Recess 17 communicates with fluid escape ducts 18 for spillage of excess fluid and ducts 18 direct fluid away from passage 15 and may dispose of it overboard. The downstream portion of passage 15, beyond ducts 18, is formed into a diverging passage 19 as shown to provide for subsonic diffusion. Diverging passage 19 conducts the fluid downstream to the burners or compressor, not shown, as the case may be. Suitable means, such as flap 20, is disposed within recess 17. Flap 20 is preferably hinged at pivot 21 for rotation into a retracted position in the recess as seen in FIGURE 2 and rotation into an extended position within passage 15 to form a converging passage as seen in FIGURE 3. The passage-side surface 22 of flap 20 is formed to provide a smooth continuous surface with concave surface 13. In addition, cap 20 may extend in length sufficiently far downstream so that duct 18 overlaps the downstream end of flap 20. It may be desirable to provide for boundary layer bleed and this is accomplished by making flap 20 of sufficient length to leave a bleed passage 23 between the downstream end of the flap and member 10 when the flap is in the extended position as shown in FIGURE 3. Thus, a continuous bleed is provided which is variable in amount, being large when the flap is retracted and small when the flap is extended. Flap 20 may be rotated by any suitable means, not shown, that can be independently operated or tied in with the powerplant control system. It can be seen from FIGURE 3 that the throat area $A_t$ is thus varied by the rotation of flap 20 about pivot 21.

The critical area ratio has been defined above as the area ratio at which the object is able to swallow the starting shock at the designed speed. As shown in FIGURE 2, this area ratio is the ratio of $A/A_2$. In other words, if the object in FIGURE 1 is traveling at its design speed, the oblique shock front may extend as shown by dotted line 24 and the normal shock at the inlet, or so-called starting shock, as line 28. However, under these conditions the inlet area ratio must be no greater than the proper critical area ratio if the starting shock wave is to be swallowed. This ratio, as previously explained, is less than that required for efficient operation. Thus, the provision of flap 20 permits this ratio to be varied. For example, the configuration shown in FIGURE 2 represents, for the designed speed, the area ratio required for the shock to be swallowed. This can be seen to be the ratio of $A/A_2$ which is the ratio obtained when the flap 20 is in the retracted position within recess 17. As thus retracted, the shock may be swallowed by the inlet and the excess fluid may be disposed of through ducts 18. Once the shock has been swallowed, as shown in FIGURE 2, the velocity in diverging portion 19 downstream of the normal shock 28 is high supersonic and thus a large loss in total pressure energy will result. In order to reduce the Mach number at which the normal shock occurs, flap 20 may be rotated into passage 15 to provide a variable throat or smaller cross sectional area $A_t$ as shown in FIGURE 3. This provides a converging passage from the inlet A to the throat $A_t$ and then a diverging passage from the throat downstream. Thus, the area ratio shown in FIGURE 3 is considerably larger than that shown in FIGURE 2. It is well known that in supersonic flow a converging passage reduces the Mach number of the fluid. Thus, the Mach number at the throat $A_t$ in FIGURE 3 is much lower than that shown in FIGURE 2. Therefore, the loss in total pressure energy resulting from the normal shock at the throat will be lower. Diverging passage 19 diffuses the flow still further reducing the velocity to low subsonic for efficient use downstream.

The normal operation of the object is that illustrated in FIGURE 3 where the shock has been swallowed and the throat decreased to provide for efficient operation of the diffuser. However, with the configuration shown in FIGURE 3, it is not possible to swallow the shock because the area ratio is too high. Thus, it is necessary to revert to the configuration shown in FIGURE 2, wherein the area ratio is equal to or less than the critical area ratio in order to swallow the shock. The FIGURE 2 configuration then represents the starting position which is the position required to swallow the shock and, once the shock is swallowed, flap 20 may be rotated to reduce the throat area, as shown in FIGURE 3, and further reduce the fluid velocity so that the normal shock occurs at a Mach number near 1.

For the configuration shown in FIGURES 1, 2 and 3, the approach Mach number at the inlet A will vary as the speed at which the object is traveling varies. Furthermore, as this approach Mach number varies, the corresponding critical area ratio and theoretical area ratio also varies. Therefore, if the configuration shown in FIGURE 3 is designed for a Mach number of 4, then at some lower flight Mach number the area ratio is actually greater than the theoretical ratio. It would be possible to adjust the area ratio to the required value by retracting flap 20 slightly. However, it is also possible to provide means for varying the area ratio by varying both the inlet area A and the throat area $A_t$, by a suitable pivot or its equivalent 26 preferably at the downstream portion of member 14. Since at below design speed the oblique shock may be represented by line 25 which falls outside of lip 16, the latter means suggested for varying the area ratio has the added advantage that it provides for a higher mass flow of fluid captured at off-design Mach numbers. Thus, the hinged throat inlet provides a means for varying the area ratio so that the critical area ratio may be set to swallow the shock and then the area ratio may be increased to provide for further reduction of the fluid velocity and the movable portion of member 14 privides a means whereby the area ratio obtained with flap 20 fully extended may be varied.

FIGURE 4 shows a typical installation of the present inlet diffuser as it might be applied to the wings of a missile. The incoming fluid is funneled by means, not shown, to the powerplant which may be contained in the missile body 27. FIGURE 5 shows a similar missile wherein the inlet diffuser is provided on the missile body or fuselage 27 in a cowl-type arrangement.

In operation, the shock is swallowed by rotating flap 20 into a retracted position in recess 17 as shown in FIGURE 2 to provide the critical area ratio necessary. When so retracted, it will be apparent that the incoming excess fluid must be disposed of and this is accomplished by bleeding off part of the fluid through ducts 18 which direct the fluid away from passage 15 as shown. Once the shock wave has been swallowed, it is then possible to treat it as represented in FIGURE 3 wherein flap 20 has been rotated into the extended position within passage 15 to provide for a smaller throat area $A_t$ and thus a much larger area ratio to further reduce the velocity of the fluid.

While I have shown the diffuser primarily in a two-dimensional form, it will be apparent that its use is not so limited that it may be used in a three-dimensional form such as in the nose of a missile as shown in FIG. 5. However, the two-dimensional form as shown is considerably easier of execution since substantially only one longitudinal dimension for flap 20 is required. In other words, the hardware or mechanical linkage required will necessarily be more complicated in a three-dimensional form although the principle of operation is identical.

While a particular embodiment of the invention has been illustrated and described, it will be obvious to those skilled in the art that various changes and modifications may be made without departing from the invention and it is intended to cover in the appended claims all such changes and modifications that come within the true spirit and scope of the invention.

What I claim as new and desired to secure by Letters Patent is:

1. A supersonic ramjet diffuser inlet for use with a reaction-type power plant comprising, a first member including a spike facing upstream and having a concave surface thereon, a flow defining member spaced from said first member to define a fluid passage therebetween, said flow defining member having a leading surface lip facing upstream and disposed downstream of the forward end of said spike, said lip curving toward said concave surface to define an inlet area therewith, a flap defining part of said passage pivoted at its upstream portion to said first member in a recess therein to rotate into said passage and provide convergency thereto and a throat area therein, and duct means to continuously bleed fluid from said passage downstream of said flap, said duct means overlapping the flap to bleed a larger amount of fluid when said flap is retracted in the recess than when said flap is rotated into said passage, said passage diverging downstream of said throat to provide subsonic diffusion.

2. A supersonic ramjet diffuser inlet for use with a reaction-type power plant comprising, a first member including a spike facing upstream and having a concave surface thereon, a flow defining member spaced from said first member to define a fluid passage therebetween, said flow defining member having a leading surface lip facing upstream and disposed downstream of the forward end of said spike, said lip curving toward said concave surface to define an inlet area therewith, the flow defining member being movable to vary said inlet area, a flap defining part of said passage pivoted at its upstream portion to said first member in a recess therein to rotate into said passage and provide convergency thereto and a throat area therein, and duct means to continuously bleed fluid from said passage downstream of said flap, said passage diverging downstream of said throat to provide subsonic diffusion.

3. A supersonic ramjet diffuser inlet for use with a reaction-type power plant comprising, a first member including a spike facing upstream and having a concave surface thereon, a flow defining member spaced from said first member to define a fluid passage therebetween, said flow defining member having a leading surface lip facing upstream and disposed downstream of the forward end of said spike, said lip curving toward said concave surface to define an inlet area therewith, the flow defining member being pivoted downstream of the throat to vary said inlet area, a flap defining part of said passage pivoted at its upstream portion to said first member in a recess therein to rotate into said passage and provide convergency thereto and a throat area therein, and duct means to continuously bleed fluid from said passage downstream of said flap, said passage diverging downstream of said throat to provide subsonic diffusion.

4. A supersonic ramjet diffuser inlet for use with a reaction-type powerplant comprising, a first member including a spike facing upstream and having a concave surface thereon, a flow defining member spaced from said first member to define a fluid passage therebetween, said flow defining member having a leading surface lip facing upstream and disposed at substantially the downstream end of said concave surface, said lip curving toward said concave surface to define an inlet area therewith, recess means in the fluid passage side of said first member including duct means leading from said recess away from said passage, a flap disposed in said recess and pivoted at the upstream end thereof to said first member for rotation into said passage to provide convergency thereto and a throat area therein to provide an area ratio greater than critical, said flap being dimensioned with respect to said recess to permit continuous bleeding from said passage in all positions of rotation, and said passage diverging downstream of the recess to provide subsonic diffusion.

5. Apparatus as defined in claim 4 wherein said duct means overlaps said flap to bleed a larger amount of fluid when said flap is retracted in the recess than when said flap is rotated into said passage.

6. Apparatus as defined in claim 5 wherein said flow defining member is movable to vary said inlet area.

7. Apparatus as defined in claim 5 wherein said flow defining member is pivoted downstream of the throat to vary said inlet area.

References Cited in the file of this patent

UNITED STATES PATENTS

| | | |
|---|---|---|
| 2,553,253 | Hays | May 15, 1951 |
| 2,579,049 | Price | Dec. 18, 1951 |
| 2,596,435 | Robert | May 13, 1952 |
| 2,763,426 | Erwin | Sept. 18, 1956 |
| 2,796,730 | Lawrence | June 25, 1957 |
| 2,876,621 | Bogert et al. | Mar. 10, 1959 |

FOREIGN PATENTS

| | | |
|---|---|---|
| 999,494 | France | Oct. 3, 1951 |
| 1,075,248 | France | Apr. 14, 1954 |
| 607,686 | Great Britain | Sept. 3, 1948 |
| 614,548 | Great Britain | Dec. 17, 1948 |